April 13, 1926.

J. M. RESCH

AUTOMATIC CAMERA

Filed March 9, 1922    2 Sheets-Sheet 1

1,580,329

Patented Apr. 13, 1926.

1,580,329

UNITED STATES PATENT OFFICE.

JOSEPH MARTIN RESCH, OF SAN FRANCISCO, CALIFORNIA, ASSIGNOR TO WILLIAM W. HOTCHKISS, OF SANTA CRUZ, CALIFORNIA.

AUTOMATIC CAMERA.

Application filed March 9, 1922. Serial No. 542,225.

*To all whom it may concern:*

Be it known that I, JOSEPH MARTIN RESCH, a citizen of the United States, and resident of the city and county of San Francisco, State of California, have invented new and useful Improvements in Automatic Cameras, of which the following is a specification.

My invention is particularly adapted to cameras of the folding type, employing films wound upon spools, although it may be employed also with other forms.

Among the principal objects of my invention is the automatic winding of the film whereby a new film surface is automatically brought into position ready for an exposure whenever the camera is opened and there remains so that no further movement of the film takes place until a single exposure has been made.

A further object is the provision of means whereby after a single exposure has been made upon a film surface, the shutter operating lever is shifted into a disappeared position and thereafter further shutter operation prevented until a new film surface is brought into exposure position; excessive film movement is also prevented and consequently the skipping of exposures is avoided. Double exposures are also avoided in that the shutter is also collapsed against all but one exposure for each film section.

A further object is the rapidity with which the camera may be brought into operation.

A further object is the exact positioning of the film before exposure independent of any attention from the operator, it not being necessary to watch the film to secure perfect registration.

My invention does away with the conventional winding key, thus presenting a more harmonious appearance.

Further objects are the accurate and easy winding of the leaders at each end of film and means whereby the shutter is set into the most frequently used adjustment and means insuring a closed shutter whenever the camera is closed.

A further object is a disappearing shutter actuating lever.

Other objects will appear from the drawings and specifications which follow.

Fig. 24 is a section through the shutter plate showing the cord and clevis.

Fig. 25 is a fragmentary view of the front of the camera showing the cord end employed for winding the leaders at each end of the film and showing the means for restoring the shutter setting to the most used position whenever the camera is closed, and which functions to close the shutter in case it had not been closed following a time exposure setting.

Fig. 26 illustrates the automatic front plate foot or rest.

Fig. 27 is a plan view of Fig. 26 with the front plate shown in section and with the foot shown folded nearly into its final closed or collapsed position.

Fig. 28 is similar to Fig. 27 but just after the foot has reached final closed position and been latched therein.

Throughout the figures similar numerals refer to identical parts.

In the particular illustration chosen to exemplify my invention I have shown a conventional folding type of camera 1, adapted to employ film.

Within the camera is shown the spool of new film at 55 and the empty spool on which the said film is to be wound, as used, is shown at 7, having the slotted axle 4.

At 5 is a mechanism compartment extending preferably across the camera casing and adapted to contain a portion of the winding and operating mechanism of my invention. At 8 is shown the front plate of the camera carrying the lens, the shutter mechanism, the supporting foot and certain other details which will be described below. When the camera is operated the front is supported from the casing by the lazy tongs 9—9 on each side of the camera in the conventional way. At 10 is shown the operating cord and at 11 the regulating wheel, and the pawl arm 12 by which the said wheel is actuated. This pawl arm is controlled through the actuation of the finger 13 which is mounted on the spindle 14 and which spindle carries also the trip 15, control arm 16 and cam 17. Above the regulating wheel 11 is the spring connected trip 19 pivoted at 36, and spring lever 20. These latter parts are brought into operation when the film spool 55 is taken out of the camera and a new film inserted therein corresponding with the movement of the trip 19 in Fig. 17 whereby the regulating wheel 11 is moved the distance corresponding with tooth 21, thereby advancing the said wheel a distance to compensate for the interrupted space occupied by the long tooth 57, which with the series of pawl teeth 49 correspond with a complete revolution of wheel 11.

At 18 is a tally disc operating synchronously at all times with the regulating wheel 11 through the key and slot connection 23 or it may be made integral therewith. At 24 is the locking plate having an end recess 25 adapted to engage the control arm 16, under certain conditions which will be described below. This locking plate may be tripped out of engagement upon the movement of the cord lever 26 raising the wing piece 27 when the said cord lever is actuated by the clevis 28, on the cord 10, during a final closing movement of the camera, under certain conditions which will be specified below, see also Figs. 16, 12, 5. This cord lever is set into operative position by the arm 29 normally raising from the low position 37 to the high position 38 upon the cam shaped periphery of the regulating wheel 11, Figs. 13, 14.

Figures 1, 2, 3, 4, 5, 6, 7, 8, 9, 10:
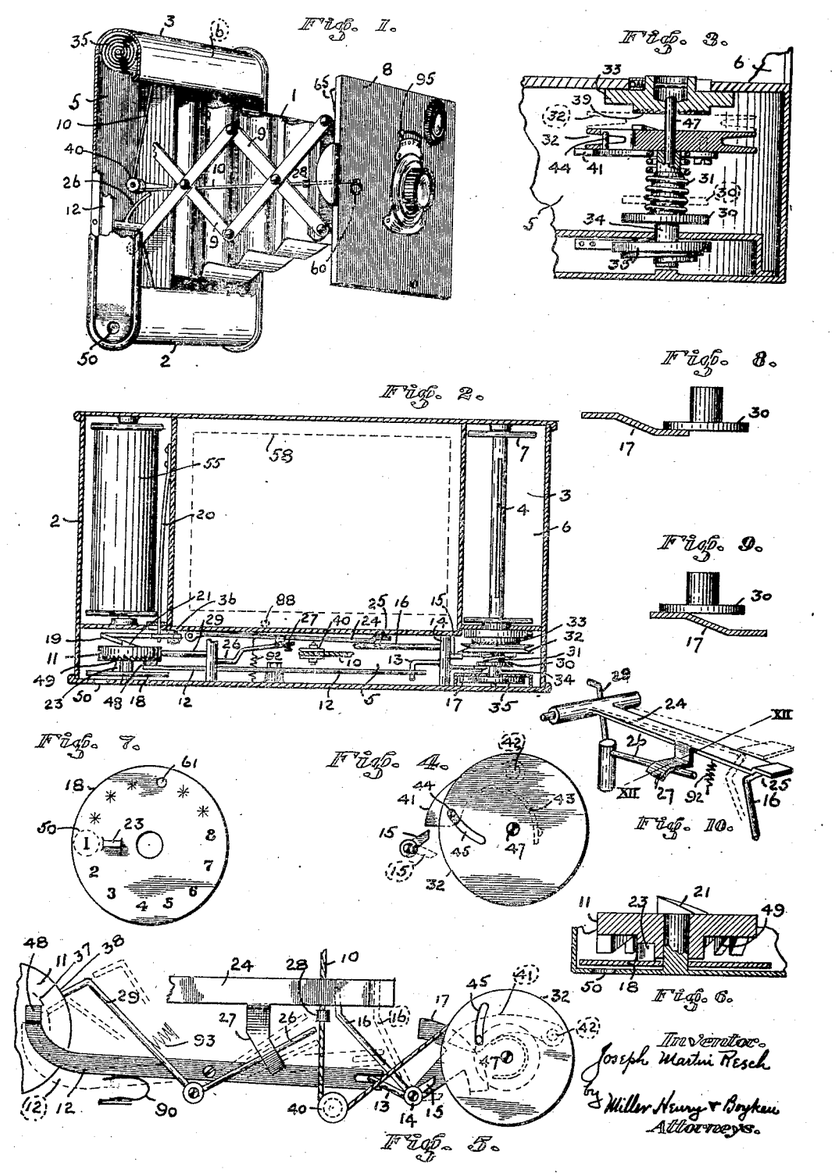
Figure 1 is a perspective view of my camera with a portion of the mechanism compartment broken away to show certain of the interior parts.
Fig. 2 is a rear view of the camera with the back removed showing certain of the mechanism of my invention and the film spools in place.
Fig. 3 is an enlarged detail, partly in section, of part of the winding mechanism.
Fig. 4 is a plan view of the winding wheel showing the disengaging trigger and trip.
Fig. 5 is similar to Fig. 4 with the parts positioned when the cord is wound thereon and showing the corresponding position of certain of the other parts.
Fig. 6 is a detail section of the regulating wheel and tally disc.
Fig. 7 is a detail plan view of the tally disc.
Fig. 8 shows the position of the thimble and cam when the winding wheel is disengaged from the crown wheel.
Fig. 9 shows the position of the thimble and cam when the winding wheel is engaged with the crown wheel and corresponds with the dotted position of the said winding wheel in Fig. 3.
Fig. 10 is a detail perspective view of the locking plate and certain of its associated parts.

The cam member 17 forms a support of variable elevation for the thimble 30 which actuates a compression spring 31 to raise the winding wheel 32 into mesh with the crown wheel 33 and therefore to couple, through the pawl and teeth 39 the said winding wheel with the spool, see Figs. 2, 3. The winding wheel is carried upon the hollow spindle 34 and is under the tension of spring 35 to a varying degree depending upon the winding action of the cord 10. The cord 10 passes over the pulley 40 and thence to the winding wheel 32, one end being fixed thereto. At 41 is shown the disengaging trigger adapted to actuate the trip 15 when the cord 10 is unwound from the wheel 32, whether the winding wheel be in its full line or dotted line position of Fig. 3. This trip is pivoted at 42, and has a normal outward movement under the action of the spring 43, when not otherwise restrained, see Figs. 4, 5. Projecting from the trigger is the pin 44 movable within the slot 45 of the winding wheel. When the wheel 32 is rotated with the trigger in the full line position of Fig. 4 the trip 15 is engaged thereby and the spindle 14 with the control arm 16 is moved through an arc from the full line to the dotted line position of Fig. 5, at which time the cam 17 is correspondingly rotated and the thimble 30 is thereupon moved from the position shown in Fig. 9 to the position shown in Fig. 8. This movement results in a reduction of the tension of the compression spring 31 so that the winding wheel at such time drops out of engagement with the crown wheel 33; that is, from its dotted position to its full line position of Fig. 3. This action is occasioned by the coil spring 35, having a slight distortion so that the said spring 35 serves not only as a winding spring for the cord but also as an axial displacing spring for the winding wheel, of slightly weaker effect, however, than the compression spring 31.

It will be noted that the pin 44 controls the movement of the disengaging trigger 41, in that when the cord is wound upon the wheel 32 the pressure of the said cord moves the pin 44 through the slot 45 towards the center 47 at which time the trigger 41 will be in its dotted line position Fig. 5 and will at all times remain in such position out of engaging range with the trip 15 unless the cord 10 is unwound to its limit from the wheel 32.

It will also be noted that when the trip 15 is actuated by the trigger 41, the pawl arm 12 is moved by the finger 13 from the full line position to the dotted line position of Fig. 5 and the pawl end 48 on the arm 12 will move the regulating wheel 11 through the distance of one tooth of the series 49, see Fig. 6.

One complete revolution of the regulating wheel corresponds with the use of one complete spool of film, and the position of the film at any time is determined by the tally disc 18 in mesh with the said wheel and which disc is observable at all times through the window 50, the said disc carries on its face suitable numbers and stars or other characters to indicate the progress and position of the film.

At 55 is shown a spool of new film which upon being inserted in the camera presses against the spring 20 which thereupon actuates the trip 19 causing the regulating wheel to rotate a distance corresponding with the tooth 21 on the upper side of said wheel and in the direction of the arrow 56, see Figs. 2, 13, 14, 16 and 17. At the same time this movement of the regulating wheel corresponds also with the length of the interrupted space occupied by the tooth 57 now positioned over the pawl 48; the parts having been in the position shown in Fig. 16 immediately before the actuation of the trip 19; that is, before the said movement has taken place, the trip 48 has been free to ride in the space 57 without, however, engaging the next tooth; and when the trip 19 makes the full movement of the tooth 21 the tooth 57 is thereby advanced until the pawl 48 may upon its next stroke fall into engagement with the first of the series of teeth 49.

It will now be noticed that the regulating wheel will be advanced through a distance corresponding with one tooth of the series 49 for every reciprocation of the pawl arm 12, and also that this movement will take place whenever the cord 10 is pulled out unwinding to its limit from the wheel 32, unless the arm 16 is already held by the locking plate 24.

The movement of the cord 10 from its full wound to its full unwound position corresponds with the opening of the camera, such, that the front plate 8 is moved from the full closed to the full open position as shown in Fig. 1, and the parts are to be proportioned and timed so that the said movement of the cord 10 rotates the spool 7 an amount corresponding with not less than that required to bring the first section of the sensitized film into position of the picture area shown by the dotted lines 58 of Fig. 2.

The cord is adapted to pass through the bushing 59 and front plate 8 shown in detail in Fig. 24 and has attached to its front a ring 60. This bushing is of such size that the abutment 28 will pass freely therethrough and when the camera is closed or in its collapsed position the ring 60 may be pulled outward to draw the cord 10 through the bushing 59 actuating the winding wheel 32 for one complete stroke and then released. This movement is repeated as often as may be necessary to wind off the first leader or dead portion of the film.

By referring now to the tally disc it will be seen that there is inscribed on its face a zero character at 61 corresponding with the new film 55 being inserted but not yet unwound. As the leader is wound on to the spool 7 by the movements of the cord 10, just described, the tally disc is moved until the numeral 1 shows under the window 50 at which time the first section of film will be in the position 58. The film is now ready for the first exposure.

The shutter actuating mechanism is indicated in Figs. 18 to 23 and consists primarily of a finger member 65 of spring material, slidably supported by the button 62 in a slot within which it may be caused to disappear; a projecting fork 66 is provided in which the actuating lever 67 of any well known or conventional shutter is adapted to engage. At 68 is shown a spring normally forcing the said finger member in an upward direction. The upper end of the finger member has a lug 69 and projecting pin or tongue 70 which latter is adapted to travel downward in the slot 71 past the end of the spring 72, so that upon being released the finger member returns upward under action of the spring 68, the end 72 diverts the movement of the pin 70, causing it thereafter to travel upward in the cam slot 73, so that the lug 69 thereupon engages on the inner side of the dog 74. This dog is normally pressed downward by the spring portion 75 so that when the movement just described takes place the said dog holds the finger member 65 into the collapsed full line position of Fig. 20 so that the shutter actuating lever 67 may not again be operated by the finger member 65 until the latter is restored to the full line position of Fig. 18, as will now be described.

Figures 11, 12, 13, 14, 15, 16, 17, 18, 20, 21, 22:
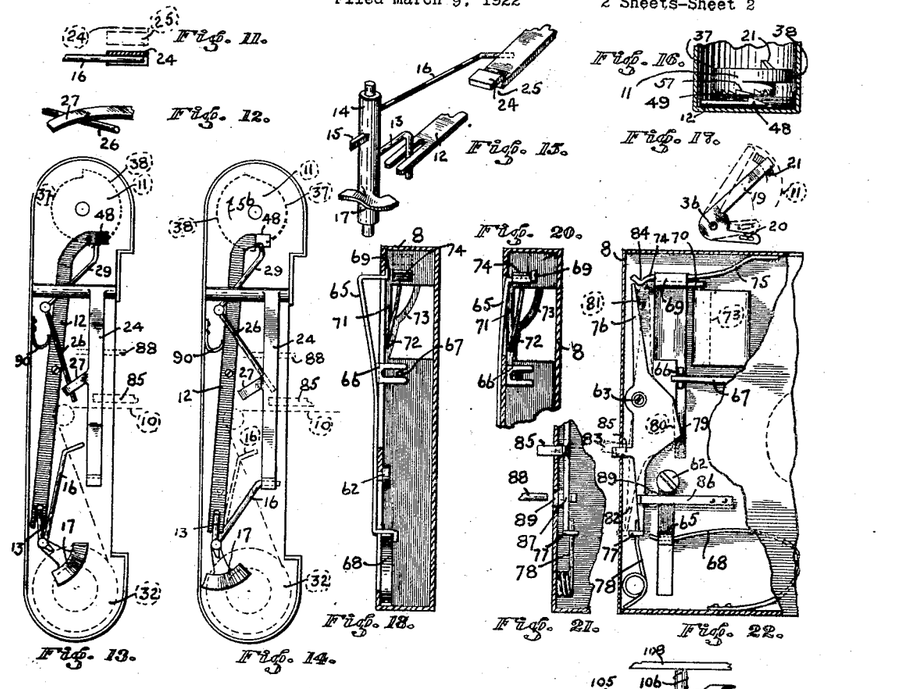
Fig. 11 is a front view of the locking plate and control arm.
Fig. 12 is a cross section on the line XII—XII of part of Fig. 10 showing the manner in which the cord lever actuates the locking plate.
Fig. 13 is a plan view of certain of the mechanism with the regulating wheel and winding wheel shown in dotted position; and corresponding with the camera being empty or with complete film and leader having been wound on spool and with the winding wheel still in engagement with the crown wheel.
Fig. 14 is similar to Fig. 13 except that a new film has been inserted and the first leader has been wound and first section of film has been brought into position corresponding with 58 of Fig. 2, by the winding mechanism and is ready for an exposure, with the winding wheel disengaged from the crown wheel and held in said position by the locking plate and control arm.
Fig. 15 is a perspective view of the locking plate, control arm, trip and cam for the winding mechanism, and showing the finger and part of the pawl arm which operates the regulating wheel.
Fig. 16 is a side view of the regulator wheel and its operating pawl.
Fig. 17 is a detail of the parts immediately over the regulator wheel of Fig. 13 adapted to advance the said wheel from the inoperative position when a new film is inserted and setting the mechanism ready to automatically control the movement of the new film.
Figs. 18, 19, 20, 21, 22, 23 are details of the disappearing shutter lever mechanism.
Figures 19, 23:
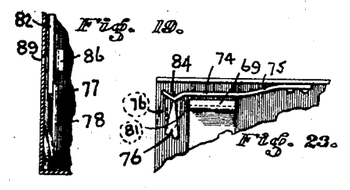

Referring particularly to Fig. 22, there is shown at 76 one end of a double lever pivoted at 63, the opposite end of which at 77 is normally under the action of the spring 78 to force the lever into the full line position shown. This lever has a cam edge 79 with which the vertical movement of the finger member 65 co-operates to shift the said face 79, from the full line position of Fig. 22 into the dotted line position 80, 81, 82 and 83. The dog 74 has the downward projecting surface 84 with which the upper end of the arm 76 is adapted to co-operate raising the dog clear of the lug 69 as shown in Fig. 23, when the arm 76 moves from its full line position Fig. 22 into the dotted position 81 of the said figure. During the movement of the said arm, the dog 74 is raised, the lug 69 is released and the dog 74 falls back into the position of Fig. 18 with the finger member released and restored into operative position as therein indicated under the action of its spring tension. Mounted on the double-ended arm 76—77 is the lug 85 which is bent around as shown also in Fig. 21 and which lug is adapted to slide over or under the locking plate 24, shown in dotted position of Figs. 13, 14. At 86 is shown a lock spring which, when the arm 77 is moved into the position 82 the said spring falls into the position 87 with its end against 82 locking the said double-ended lever in its shifted position. The lug 85 is now in the dotted position 83 and when the camera is closed the said lug just passes under the locking lever 24.

At 88 (see also Fig. 2) is a projecting pin which passes freely through the hole 89 as the last movement of the camera closure is effected, and presses against the spring 86 releasing it from the locking position 87 of Fig. 21 to the position of freedom of Fig. 22, at which time the lug 85 through the action of the spring 78 causes the locking arm 24 to be lifted from the full line to the dotted line position of Figs. 10 and 11 at which time the controlling arm 16, is released and caused to swing into its full line position of Fig. 5, which latter action takes place through the spring 90 diagrammatically indicated.

It will now be seen that if the camera is ready for an exposure but no exposure has been made the parts will be in the full line position shown in Fig. 22 and the lug 85 clears over the plate 24. The said plate then retains the arm 16 in locked position of Fig. 14, regardless of whether or not the camera be open or closed an indefinite number of times, but after the actuating of the shutter by the finger member 65, the lug 85 will be placed in the position 83 such that when the camera is again closed the locking plate 24 will be actuated thereby as above described resulting in the release of the control arm 16 which moving into the dotted position 16 of Fig. 14 will shift the cam 17 from the position of Fig. 8 to that of Fig. 9 whereupon the winding wheel 32 will be again engaged with the crown wheel 33 and the parts be thus positioned so that when the camera is again opened and the cord 10 thereby withdrawn, the winding wheel will move the film, winding the exposed section and positioning a new section at 58, and the tally disc will move so that the next numeral will be indicated under the window 50. The camera is now ready for another exposure. It will also be seen that if one exposure has been made the finger member 65 will have moved into its collapsed or disappeared or inoperative position shown in Fig. 20 and will be there held by the dog 74 until the arm 76 has moved to release the said dog and that this last movement will not take place until the camera has again been collapsed and the pin 88 caused to release the spring 86 when the spring 78 actuates the said arm 76 releasing the locking plate 24, as above described, thus the control arm reestablishes the operative position of the winding wheel and crown wheel for the film spool 7.

Referring now to Fig. 25 wherein is shown the shutter restoring mechanism. The numeral 96 indicates a lever pivoted at 97 and adapted to be actuated by the trip 98 carried by the lazy tongs 9 so that as the camera front 8 is collapsed the lever 96 is raised. This movement actuates the bell crank 99—99 having an arm 100 which is adapted to engage the shutter setting lever 95.

It will now be seen that the collapse of the camera front shifts the arm 100 to the left in the figure, thereby moving the shutter into the position of 1/25 of a second. This being the position chosen in the illustration Fig. 11 as that of maximum use and it will also be seen that when the camera is open the lug 98 permits the lever 96 to fall, causing the arm 100 to move to the right so that at times of camera use the operator may adjust the shutter to any setting he desires, and then upon closing the camera the shutter will be restored to the 1/25 position. If the operator has opened but failed to close the shutter as when taking a time exposure requiring two shutter operations, the movement of the arm 100 on closing the camera will not only restore the shutter to the aforesaid setting of 1/25 of a second but will also close the shutter and prevent the possibility of spoiling the next film.

The front foot or camera rest is shown at 105, see Figs. 26, 27, 28. This foot is normally under the tension of the spring 106 to force it from the full line to the dotted line position and is only restrained from moving into said position by the latch 109. The spring 106 is carried on the button 107 mounted on the spring arm 108 and the latch 109 holds the foot in the full line position due to the action of the spring 108. To bring the foot into use the operator presses the button 107. This movement disengages the foot from the latch 109 under the action of the spring 106 and the foot moves into its dotted position.

At 110 is shown a cross bar connected with some movable position of the camera, preferably with the lazy tongs 9, and which when the camera is open is thereby moved into the dotted position of Fig. 26. At 111 is an arm and roller projecting from the said foot which is engaged upon the closing of the camera, and the downward movement of the cross bar 110, carrying the said foot from the dotted position into the full line or collapsed position until it rides over the sloping surface of the latch 109 and is snapped or engaged behind the said latch by the action of the spring arm 108. Or the spring 106 may also have a compression in the direction of button movement, and the member 108 may be rigid, in which case the expanding of the spring 106 may be utilized to snap the said foot in position behind the latch 109.

The operation is as follows: Assuming the camera to be empty of film and closed; the first operation is that of removing the conventional cover plate from the film compartments; the new spool of film which is to be inserted in the camera is unsealed and the free end of the first leader laced through the slot 4 in the spindle of an empty spool 7 in the conventional way. The spool of new film is now introduced in the compartment over the regulator wheel at 55 which results in a lateral movement of the spring lever 20 causing a rotation of the regulator wheel corresponding with the tooth 21 and sets the regulator wheel in position to thereafter be rotated tooth by tooth for each of the movements of the pawl arm 12.

Simultaneously with the introduction of this new film the spool 7 is inserted in the other compartment adjacent the winding wheel and is fixed or clutched into engagement with the crown wheel in the conventional way. The film compartments are now closed with the cover plate and the remaining portion of the leader is unwound from the film spool 55 and wound on the spool 7 by drawing the ring 60 on the operating cord 10 outward to its limit. This rotates the winding wheel and therefore the spool 7 through one cycle of winding operation, causing a corresponding movement of the pawl arm 12. The regulator wheel now advances one tooth of the series 49 at which time the first star on the tally disc 18 is observable under the window 50. The regulator wheel with its projecting cam surface 38 holds the cord lever 26 in such position that the clevis 28 on the cord 10 will, when the ring and cord are released, engage the said lever lifting the locking plate and permitting the re-engagement of the winding wheel with the crown wheel. A second pulling outward of the ring 60 winds a second portion of the first leader on the spool and brings the second star into position under the window 50. The ring 60 is now released and a third movement outward of the said cord brings the third star into position, placing the last portion of the first leader into the dotted position 58 of Fig. 2. The camera front may now be pulled out preparatory to taking the first picture and this movement causes another cycle of operation of the parts bringing the first section of sensitive film into the position 58, and the camera is ready for an exposure. Or this last operation may be performed by another cycle of cord movement without pulling out the front of the camera. In any event when the first section of sensitized film is positioned at 58, ready for the first exposure the cam surface 37 on the regulator wheel has caused a movement of the cord lever 26 such that it is out of engaging range of the clevis 28 and therefore the locking plate 24 will retain the lever 16, and the winding wheel is thus retained in disengaged position from the crown wheel. No further winding of the film can therefore occur, however many times the camera may be opened or the cord pulled until the locking plate 24 is disengaged from the lever 16.

This last occurs only after the shutter has been operated; that is, after the first section of film has been exposed through the actuation of the shutter.

This shutter actuation has occurred after setting the diaphragm and shutter in the conventional way, for either time or instantaneous exposure and then depressing the finger member 65. Assuming the shutter has previously been set for instantaneous exposure, this finger member now upon being released disappears within the adjacent slot of the front plate, and is held in such position by the dog 74 so that no further operation or exposure can be effected on the first section of film. If the shutter has been set for a time exposure, the finger member returns upward only part way through the cam slot 73, not collapsing into its final disappeared position, and is therefore operable for a second movement to close the shutter at the completion of the time exposure. This second movement allows the returning upward of the finger member to its limit and it is then retained in its collapsed or disappeared position and is now inoperative for any further exposure until certain other movements have taken place. Operation of the finger member has actuated the cam edge 79 setting the lug 85 into its dotted position 83, such that the said lug engages under the locking plate 24 when the camera is closed and not otherwise. It will be remembered that the locking plate is in a position holding the lever 16 so that the winding wheel is out of engagement with the crown wheel. Upon closing the camera the pin 88 passes through the hole 89 releasing the lock spring 86 whereupon the lug 85 is restored to its original position, carrying with it a movement of the locking plate 24 to release the lever 16, whereupon the cam 17 raises the thimble, and therefore the winding wheel, engaging the ratchet between the said winding wheel and the crown wheel, so that the parts are now set for the winding of a second section of film.

The shutter mechanism is also reset coincident with the movement of the lug 85 by the arm end 76 releasing the dog 74 and thus restoring the finger member 65 into its operative position, in which position it is now retained by the said dog.

The camera may now be used for a second exposure by pulling the front outward as before, which winds the second section of film into the position 58, and the number 2 shows on the tally disc under the window 50, and the shutter is ready for the second exposure.

This cycle of operations may be continued until the last section of film is wound into position 58 and exposed and the camera closed after which the next movement of the cord outward brings the cam surface 38 of the regulator wheel into action bringing the cord lever into position to be acted on by the clevis.

It will be noted that if my shutter has been opened for a time exposure and the operator has failed to make the second finger member movement to close the shutter; as the camera front is collapsed the lug on the lazy tongs actuates the shutter-restoring-mechanism setting the shutter at the most used position and also insures a closed shutter whenever the camera is closed.

It also retains a closed shutter unless new sensitized film is in the proper position for a single exposure. It prevents more than one exposure on one section of film, and it provides for automatic winding and positioning of film at all times. It is to be noted that while I have shown a preferred form of device and operative relationship between the several parts and devices, the various functions may be performed by other devices and the operative relationship of some of the parts may be embodied in various forms without departing from the spirit of my invention and I wish to be understood as claiming all such variations.

I claim:

1. In a folding camera, film winding mechanism comprising an element connected at one end to a movable part of the camera and adapted to be wound on a winding wheel, a driving wheel, and a winding wheel in axial alignment, clutch means between said wheels, cam actuated means for engaging or disengaging said clutch means, a spring to actuate said winding wheel, a trip associated with said wheel constructed and adapted to actuate said cam means to disengage the clutch means when the element has been unwound and to collapse out of engaging position with said cam means when the element is being wound on said winding wheel.

2. In a folding camera, apparatus as set forth in claim 1 wherein said spring also exerts a tension to disengage said clutch means.

3. In a folding camera, apparatus as set forth in claim 1 and a spring and thimble interposed between said winding wheel and said cam means.

4. In a folding camera, film winding mechanism comprising an element connected at one end to a movable part of the camera and adapted to be wound on a winding wheel, a driving wheel and a winding wheel in axial alignment, clutch means between said wheels, cam actuated means for engaging or disengaging said clutch means, a spring to actuate said winding wheel, a trip associated with said wheel constructed and adapted to actuate said cam means to disengage the clutch means when the element has been unwound and to collapse out of engaging position with said cam means when the element is being wound on said winding wheel, a control arm rigid with said cam actuated by said trip and a locking plate for said arm adapted to hold said control arm and thereby said cam in position corresponding with disengaged clutch means, and release means adapted to release said plate when the camera is closed.

5. Apparatus as set forth in claim 4 and shutter mechanism controlling said release means and constructed and adapted to bring said release means into operative position to actuate said plate following a shutter operation.

6. Apparatus as set forth in claim 4 and regulating mechanism and a connection for actuating said mechanism integral with said cam.

7. Apparatus as set forth in claim 4 and regulating mechanism and a connection for actuating said mechanism integral with said cam, said regulating mechanism comprising a regulating wheel and a series of ratchet teeth and an interruption in said series and a pawl arm actuating consecutively the teeth of said series, and independently operable means to advance said regulating wheel over said interruption.

8. Apparatus as set forth in claim 4 and regulating mechanism and a connection for actuating said mechanism integral with said cam, said regulating mechanism comprising a regulating wheel and a series of ratchet teeth and an interruption in said series and a pawl arm actuating consecutively the teeth of said series, and independently operable means to advance said regulating wheel over said interruption adapted to be actuated upon the insertion of a film spool.

9. Apparatus as set forth in claim 4 and regulating mechanism and a connection for actuating said mechanism integral with said control arm, a cam synchronous with said regulating mechanism and an element engaging lever adapted to actuate the locking plate and to be positioned by said cam in accord with predetermined film positions, means associated with said element to actuate said engaging lever when said lever is so positioned and to thereby release said locking plate when the element is wound on the winding wheel.

10. Apparatus as set forth in claim 4 and regulating mechanism and a connection for actuating said mechanism integral with said control arm, said regulating mechanism comprising a regulating wheel and a series of ratchet teeth and an interruption in said series and a pawl arm actuating consecutively the teeth of said series, and independently operable means to advance said regulating wheel over said interruption, a cam synchronous with said regulating wheel and an element engaging lever adapted to actuate the locking plate and to be positioned by said cam in accord with predetermined film positions, means associated with said element to actuate said engaging lever when said lever is so positioned and to thereby release said locking plate when the element is wound on the winding wheel.

11. Apparatus as set forth in claim 4 and regulating mechanism and a connection for actuating said mechanism integral with said control arm, said regulating mechanism comprising a regulating wheel and a series of ratchet teeth and an interruption in said series and a pawl arm actuating consecutively the teeth of said series and independently operable means to advance said regulating wheel over said interruption adapted to be actuated upon the insertion of a film spool, a cam synchronous with said regulating wheel and an element engaging lever adapted to actuate the locking plate and to be positioned by said cam in accord with predetermined film positions, means associated with said element to actuate said cord lever when said lever is so positioned and to thereby release said locking plate when the element is wound on the winding wheel.

12. Apparatus as set forth in claim 4 and regulating mechanism and a connection for actuating said mechanism integral with said control arm, a cam synchronous with said regulating wheel and an engaging lever adapted to actuate the locking plate and to be positioned by said cam in accord with predetermined film positions, means associated with said element to actuate said engaging lever when said lever is so positioned and to thereby release said locking plate when the element is wound on the winding wheel and at other positions of the cam moving the said engaging lever out of the range of said element actuating means.

13. Apparatus as set forth in claim 4 and regulating mechanism and a connection for actuating said mechanism integral with said control arm, said regulating mechanism comprising a regulating wheel and a series of ratchet teeth and an interruption in said series and a pawl arm actuating consecutively the teeth of said series, and independently operable means to advance said regulating wheel over said interruption, and at other positions of the cam moving the said engaging lever out of the range of said element actuating means.

14. Apparatus as set forth in claim 4 and regulating mechanism and a connection for actuating said mechanism integral with said control arm, said regulating mechanism comprising regulating wheel and a series of ratchet teeth and an interruption in said series and a pawl arm actuating consecutively the teeth of said series, and independently operable means to advance said regulating wheel over said interruption adapted to be actuated upon insertion of a film spool and at other positions of the cam moving the said engaging lever out of the range of said element actuating means.

15. In a film winding camera a shutter, means for operating said shutter including an operating member and an adjacent slot therefor, displacing means forcing a movement of said member into a disappeared position when the member is operated and then released, and a spring forcing said member into said disappeared position when the member is released, a dog adapted to hold said member in said disappeared position, releasing means for said operating member actuated by the winding of the film.

16. In a film winding camera, the combination of a shutter, means for operating said shutter including an operating member and an adjacent slot therefor, displacing means forcing a movement of said member into a disappeared position when the member is operated and then released, and a spring forcing said member into said disappeared position when the member is released, a dog adapted to hold said member in said disappeared position, releasing means for said operating member actuated by the winding of the film, a lug adapted to be shifted on the operation of the member, a catch adapted to hold the lug in said shifted position.

17. In a film winding camera the combination of a camera shutter, means for operating said shutter including an operating member and an adjacent slot therefor, displacing means forcing a movement of said member into a disappeared position when the member is operated and then released, and a spring forcing said member into said disappeared position when the member is released, a dog adapted to hold said member in said disappeared position, and releasing means for said operating member actuated by the winding of the film.

18. In a film winding camera the combination of a camera shutter, means for operating said shutter including an operating member and an adjacent slot therefor, displacing means forcing a movement of said member into a disappeared position when the member is operated and then released, and a spring forcing said member into said disappeared position when the member is released, a dog adapted to hold said member in said disappeared position and releasing means for said operating member actuated by the winding of the film, a lug adapted to be shifted on the operation of the member, a catch adapted to hold the lug in said shifted position, and a device adapted to shift said dog and release said member when the catch is released and the lug is returned.

19. In combination with a folding camera, apparatus as set forth in claim 18 and a spring adapted to return said lug and said device to their first position during which movement said dog releases said member from said disappeared position.

20. Apparatus as set forth in claim 4 and shutter mechanism controlling said release means and constructed and adapted to bring said release means into operative position to actuate said plate following a shutter operation, in combination with a shutter and mechanism and means for operating said shutter including an operating member and an adjacent slot therefor, a cam track establishing a cycle of movement of said member into collapsed position when the operating member is operated and then released, and a spring forcing said member through said cam track when the member is released, a dog adapted to hold said member in collapsed position, a lug adapted to be shifted on the operation of the member, a lock spring adapted to hold the lug in said shifted position and releasing means positioned on said camera to release said catch and said lug when the camera is collapsed.

21. In combination with a folding camera apparatus as set forth in claim 18 and a spring adapted to return said lug and said device to their first position during which movement said dog releases said member from collapsed position, and spring means acting to restore said member to said operating position, in combination with film winding mechanism comprising a driving wheel and a winding wheel in axial alignment, clutch means between said wheels, cam means for engaging or disengaging said clutch means, a spring to actuate said winding wheel, a trip associated with said winding wheel constructed and adapted to actuate said cam means to disengage the clutch means when the element has been unwound and to collapse out of engaging position when the element is being wound on said winding wheel, and said element connected at one end to a movable part of the camera and adapted to be wound on the winding wheel.

22. In combination with a folding camera, apparatus as set forth in claim 18, a device positioned on said camera adapted to release said catch and said lug and said device and a spring adapted to return said lug and said device to their first position, during which movement said dog releases said member from collapsed position, in combination with a spring and thimble interposed between said winding wheel and said cam means.

23. In combination with a folding camera, apparatus as set forth in claim 18, and a spring adapted to return said lug and said device to their first position during which movement said dog releases said member from collapsed position, in combination with a control arm rigid with a cam and a locking plate for said arm adapted to hold said control arm and thereby said cam in position corresponding with disengaged clutch means, and release means adapted to release said plate when the camera is closed.

24. In combination with a camera having a rear portion constructed and adapted to utilize film, a front portion movably connected with said rear portion, said rear portion provided with a pocket for receiving a roll of film and a second pocket for receiving a spool, a rotary member having connecting means to said spool, a winding wheel axially aligned with said rotary member and adapted to move into or out of clutch engagement with said member, mechanism constructed and adapted to move said winding wheel axially, connections between said front portion and said winding wheel whereby said wheel is rotated when the front is moved, and a movable trip on said wheel held out of engagement with a trigger when the front is moved throughout the greater part of its range of movement and released to engage said trigger during the last part of said movement, a trigger and associated devices adapted to move said wheel away from engagement with said member when the trigger is actuated by the trip.

25. In combination with a folding camera, winding mechanism constructed and adapted to wind a predetermined length of film at each cycle of camera operation, a pawl arm and means to actuate the same on the last of each winding operation, a regulating wheel with one large and a plurality of small teeth and provided with a cam edge, said pawl arm having a range of movement less than said large tooth and adapted to engage consecutively said plurality of teeth, a lever riding on said cam, a locking arm adapted to lock said first named means when a cycle of winding has been completed, and said lever adapted to shift said locking arm out of said locking engagement.

26. In a folding camera, film winding mechanism comprising an element connected at one end to a movable part of the camera and adapted to be wound on a winding wheel, a driving wheel and a winding wheel in axial alignment, clutch means between said wheels, cam means for engaging or disengaging said clutch means, a spring to actuate said winding wheel, a trip associated with said wheel constructed and adapted to actuate said cam means to disengage the clutch means when the element has been unwound and to collapse out of engaging position when the element is being wound on said winding wheel, in combination with shutter mechanism and connections between said shutter mechanism and said winding wheel constructed and adapted to automatically engage the winding wheel to wind the film.

27. In a film winding camera, a shutter having a time setting means, means for operating said shutter including an operating member and an adjacent slot therefor, displacing means forcing a movement of said member into a disappeared position when the member is operated and then released, and a spring forcing said member into said disappeared position when the member is released, a dog adapted to hold said member in said disappeared position, releasing means for said operating member actuated by the winding of the film, mechanism constructed and adapted to shift the shutter setting from a time exposure on closing the camera.

JOSEPH MARTIN RESCH.